US012332783B2

(12) United States Patent
Ambroladze et al.

(10) Patent No.: US 12,332,783 B2
(45) Date of Patent: Jun. 17, 2025

(54) INPUT/OUTPUT (I/O) STORE PROTOCOL FOR PIPELINING COHERENT OPERATIONS

(71) Applicant: International Business Machines Corporation, Armonk, NY (US)

(72) Inventors: Ekaterina M. Ambroladze, Somers, NY (US); Matthias Klein, Poughkeepsie, NY (US); Sascha Junghans, Ammerbuch (DE); Kevin Lopes, Wallkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 260 days.

(21) Appl. No.: 17/962,829

(22) Filed: Oct. 10, 2022

(65) Prior Publication Data
US 2024/0119000 A1  Apr. 11, 2024

(51) Int. Cl.
G06F 12/0802 (2016.01)
G06F 13/16 (2006.01)

(52) U.S. Cl.
CPC ...... *G06F 12/0802* (2013.01); *G06F 13/1668* (2013.01); *G06F 2212/621* (2013.01)

(58) Field of Classification Search
CPC ............. G06F 12/0802; G06F 13/1668; G06F 2212/621
See application file for complete search history.

(56) References Cited

U.S. PATENT DOCUMENTS

| 5,887,134 | A | 3/1999 | Ebrahim |
| 10,042,554 | B2 | 8/2018 | Ambroladze |
| 10,528,253 | B2 | 1/2020 | Ambroladze |

(Continued)

FOREIGN PATENT DOCUMENTS

| WO | 20050410472 W | 5/2005 |
| WO | 20191330841 W | 7/2019 |

OTHER PUBLICATIONS

U.S. Appl. No. 95/693,622, filed May 19, 2016, Sanzone Robert A.
U.S. Appl. No. 98/581,902, filed Jul. 28, 2016, Ambroladze Ekaterina M.

(Continued)

*Primary Examiner* — Eric T Loonan
(74) *Attorney, Agent, or Firm* — Cantor Colburn LLP; Edward Wixted (57) ABSTRACT

A data processing system includes a system fabric coupling a coherence manager and an input/output (I/O) requestor. The I/O requestor issues a first snoop request of a first I/O store operation and a subsequent second snoop request of a second I/O store operation. Each of the first and second snoop requests specifies an update to a respective storage location identified by a coherent memory address. The I/O requestor receives respective ownership coherence responses for each of the first and second I/O store operations. The respective first and second ownership coherence responses indicate the coherence manager has concurrent coherence ownership of the memory address for both the first and second I/O store operations. In response to receipt of each of the ownership coherence responses, the I/O requestor issues respective first and second execute coherence responses to command the coherence manager to initiate updates to the respective storage locations.

18 Claims, 7 Drawing Sheets

(56) References Cited

U.S. PATENT DOCUMENTS

| | | | |
|---|---|---|---|
| 10,747,688 B2 | 8/2020 | Jen | |
| 10,977,197 B2 | 4/2021 | Tan | |
| 11,307,873 B2* | 4/2022 | Halpern | G06F 15/825 |
| 2003/0093657 A1* | 5/2003 | Mayfield | G06F 12/0831 |
| | | | 712/245 |
| 2006/0129726 A1* | 6/2006 | Barrett | G06F 13/1663 |
| | | | 710/107 |
| 2007/0022253 A1 | 1/2007 | Cypher | |
| 2009/0276580 A1* | 11/2009 | Moyer | G06F 12/0831 |
| | | | 711/146 |
| 2011/0320743 A1* | 12/2011 | Hagspiel | G06F 12/0815 |
| | | | 711/E12.001 |
| 2014/0310487 A1* | 10/2014 | Goodman | G06F 12/121 |
| | | | 711/159 |
| 2015/0012713 A1* | 1/2015 | Flanders | G06F 12/0831 |
| | | | 711/146 |
| 2017/0351516 A1* | 12/2017 | Mekkat | G06F 9/3834 |
| 2018/0374522 A1 | 12/2018 | Ambroladze | |
| 2022/0083472 A1* | 3/2022 | Vash | G06F 12/0831 |
| 2024/0119000 A1* | 4/2024 | Ambroladze | G06F 12/0857 |

OTHER PUBLICATIONS

"Announcing IBM z16: Real-time AI for Transaction Processing at Scale and Industry's First Quantum-Safe System," https://newsroom.ibm.com/2022-04-05-Announcing-IBM-z16-Real-time-AI-for-Transaction-Processing-at-Scale-and-Industrys-First-Quantum-Safe-System, Apr. 5, 2022, 5 pages (Grace Period Disclosure).

"Graph Aware Caching Policy for Distributed Graph Stores," IPCOM000240727D, Feb. 23, 2015, 6 pages.

"Item Recommendations for Cache and Synchronization of Application Stores," IPCOM000257131D, Jan. 15, 2019, 32 pages.

"Methodology for Optimizing Wan Caching Associated With Cloud Object Store Backend," IPCOM000268803D, Mar. 1, 2022, 12 pages.

"Parallel Store Buffer With Chained Stores Capability," IPCOM000184163D, Jun. 12, 2009, 5 pages.

Cortes, T. et al., "Avoiding The Cache-Coherence Problem in a Parallel/Distributed File System," Lecture Notes in Computer Science, Jan. 1997, 18 pages.

Vankov, I. et al., "Do Arbitrary Input-Output Mappings in Parallel Distributed Processing Networks Require Localist Coding?" Language, Cognition and Neuroscience, Dec. 2, 2016, 9 pages.

Transmittal letter for Information Disclosure Statement.

* cited by examiner

INPUT/OUTPUT (I/O) STORE PROTOCOL FOR PIPELINING COHERENT OPERATIONS

BACKGROUND OF THE INVENTION

The present invention relates in general to data processing, and in particular, to a data processing system communication protocol that expedites input/output (I/O) store operations.

A data processing system may include multiple processing elements and multiple input/output adapters (IOAs) that support connections to communication networks, storage devices and/or storage networks, and peripheral devices. In such data processing systems, an important metric of I/O store performance is the store-to-store latency of coherent store operations. In recent years, much attention has been devoted to decreasing store-to-store latency by improving storage architectures, implementing higher performance storage devices, and increasing the bandwidth of I/O and/or system interconnects. The present disclosure appreciates that the store-to-store latency of coherent store operations to a storage location can alternatively or additionally be decreased through implementation of an improved coherence protocol for I/O store operations.

SUMMARY OF THE INVENTION

In at least one embodiment, a data processing system includes a system fabric coupling a coherence manager and an input/output (I/O) requestor. The I/O requestor issues a first snoop request of a first I/O store operation and a subsequent second snoop request of a second I/O store operation. Each of the first and second snoop requests specifies an update to a respective storage location identified by a coherent memory address. The I/O requestor receives respective ownership coherence responses for each of the first and second I/O store operations. The respective first and second ownership coherence responses indicate the coherence manager has concurrent coherence ownership of the memory address for both the first and second I/O store operations. In response to receipt of each of the ownership coherence responses, the I/O requestor issues respective first and second execute coherence responses to command the coherence manager to initiate updates to the respective storage locations.

DETAILED DESCRIPTION OF ILLUSTRATIVE EMBODIMENT

Figure 1:
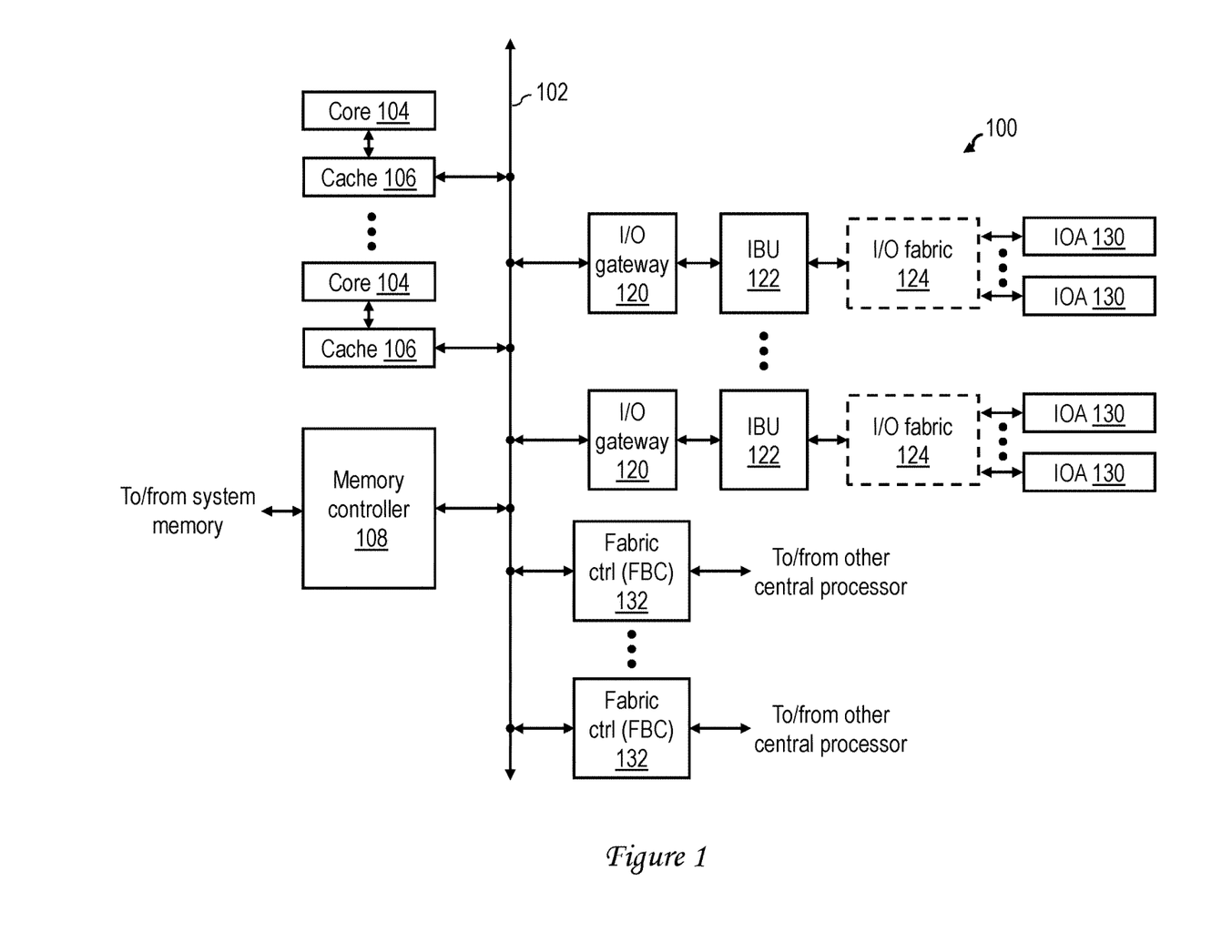
FIG. 1 is a high-level block diagram of an exemplary data processing system in accordance with one embodiment.

With reference now to the figures, and in particular with reference to FIG. 1, there is illustrated a high-level block diagram of an exemplary data processing system 100 in accordance with at least one embodiment. In some implementations, data processing system 100 can be implemented as a single integrated circuit chip having a semiconductor substrate in which integrated circuitry is fabricated as is known in the art. In some implementations, data processing system 100 may comprise a central processor (CP) forming a portion of a larger scale data processing system, as discussed further below with reference to FIGS. 2-3.

In some embodiments, data processing system 100 of FIG. 1 may be a symmetric multiprocessor (SMP) system including a system fabric 102, which may include, for example, one or more bused or switched communication links. In one example embodiment, system fabric 102 may be implemented utilizing a ring interconnect. Coupled to system fabric 102 is a plurality of data processing system components capable of communicating various requests, addresses, data, coherency, and control information via system fabric 102. These components include a plurality of caches 106, each providing one or more levels of relatively low latency temporary storage for data and instructions likely to be accessed by an associated processor core 104. As is known in the art, each processor core 104 processes data through the execution and/or processing of program code, which may include, for example, software and/or firmware and associated data, if any. This program code may include, for example, a hypervisor, one or more operating system instances to which the hypervisor may allocate logical partitions (LPARs), and application programs.

Data processing system 100 additionally includes a memory controller 108 that controls read and write access to off-chip system memory (not illustrated). In some embodiments in which data processing system 100 forms part of a larger scale data processing system including multiple CPs, memory controller 108 implements a memory coherence directory that tracks the coherence of data blocks that are accessed and possibly cached in one or more other CPs.

Data processing system 100 further includes one or more input/output (I/O) bridge units (IBUs) 122 supporting I/O communication with various I/O adapters (IOAs) 130, such as, for example, network adapters, storage device controllers, display adapters, peripheral adapters, etc. In the depicted embodiments, each IBU 122 is communicatively coupled to system fabric 102 via a respective I/O gateway 120 and may be communicatively coupled with one or more of IOAs 130 via an I/O fabric 124, such as a peripheral component interconnect express (PCIe) bus. IBUs 122 issue memory access operations, such as I/O read operations and I/O store operations, on system fabric 102 on behalf of their attached IOAs 130. In at least some embodiments, data processing system 100 may also include one or more fabric controllers (FBCs) 132 that support the coupling of data processing system 100 with one or more additional homogeneous or heterogeneous processing nodes to form a larger scale data processing system.

Those of ordinary skill in the art will appreciate that the architecture and components of a data processing system can vary between embodiments. For example, other components, storage devices, and/or interconnects may alternatively or additionally be used. Accordingly, the exemplary data processing system 100 given in FIG. 1 is not meant to imply architectural limitations with respect to the claimed inventions.

Figure 2:
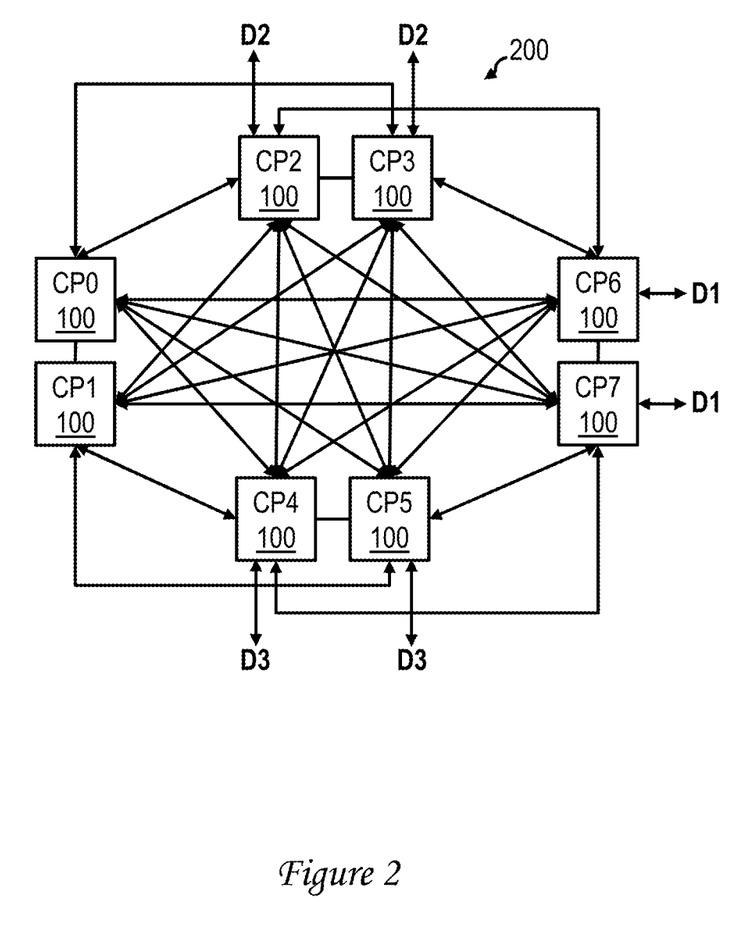
FIG. 2 is a block diagram of an exemplary processing drawer of a larger scale data processing system in accordance with one embodiment.

As noted above, in some embodiments, data processing system 100 of FIG. 1 can be a CP forming a component of a larger scale data processing system. Referring now to FIG. 2, there is depicted a block diagram of an exemplary interconnection of central processors (CPs) as shown in FIG. 1 to form a larger scale data processing system in accordance with one embodiment.

Figure 3:
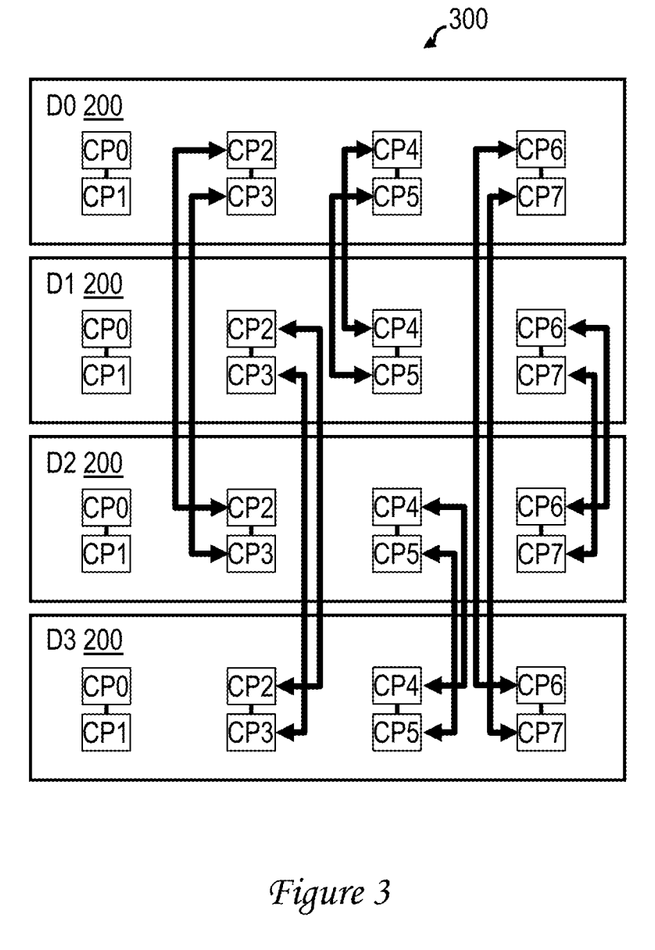
FIG. 3 is a block diagram of an exemplary larger scale data processing system in accordance with one embodiment.

In the example shown in FIG. 2, a processing drawer 200 suitable for stand-alone use or for use as a building block of an even larger scale data processing system may include eight CPs 100, identified as CP0 to CP7. Each CP 100 includes at least eight FBCs 132 supporting communicative coupling (e.g., via buses, cabling, or other transmission media) to other CPs 100. In the example of FIG. 2, each of CP0 100 and CP1 100 is communicatively coupled to seven other CPs 100 within processing drawer 200. Each of CP2 100 to CP7 100 is coupled not only to each of the seven other CPs 100 within the same processing drawer 200, but is capable of being further coupled to a CP 100 in a different processing drawer 200. Thus, as shown in FIG. 3, a larger scale data processing system 300 having four processing drawers 200 (designated as drawers D0 to D3) can be formed by respectively coupling CP2 and CP3 of drawer D0 200 to CP2 and CP3 of drawer D2 200, respectively coupling CP4 and CP5 of drawer D0 200 to CP4 and CP5 of drawer D1 200, respectively coupling CP6 and CP7 of drawer D0 200 to CP6 and CP7 of drawer D3 200, respectively coupling CP2 and CP3 of drawer D1 200 to CP2 and CP3 of drawer D3 200, respectively coupling CP4 and CP5 of drawer D2 200 to CP4 and CP5 of drawer D3 200, and respectively coupling CP6 and CP7 of drawer D1 200 to CP6 and CP7 of drawer D2 200. With the interconnect architecture of FIG. 3, an IBU 122 in any of drawers D0 to D3 200 can issued I/O read operations and/or I/O store operations targeting memory-mapped storage locations associated with any CP 100 in any of drawers D0 to D3 200.

In a preferred embodiment, the memory system of a data processing system 100, 200, or 300 is fully coherent, meaning that, at a minimum, no processor core 104 is permitted to observe a previous value of a data granule after the data granule has been updated to a new value. To enforce this observability requirement, caches 106 and memory controller 108 typically maintain, in association with each cache line of data, a coherence state that specifies, among other things, whether a given copy of cache line of data is valid, whether the copy of the cache line is unique throughout the data processing system 100, 200, or 300, whether the copy of the cache line is consistent with a system memory, and under what conditions an additional copy or copies of a cache line can be created. Typically, coherence states associated with a given cache line are maintained and/or updated based on messaging on the system fabric(s) 102 of a data processing system 100, 200 or 300 in accordance with a selected coherence protocol.

Figure 4:
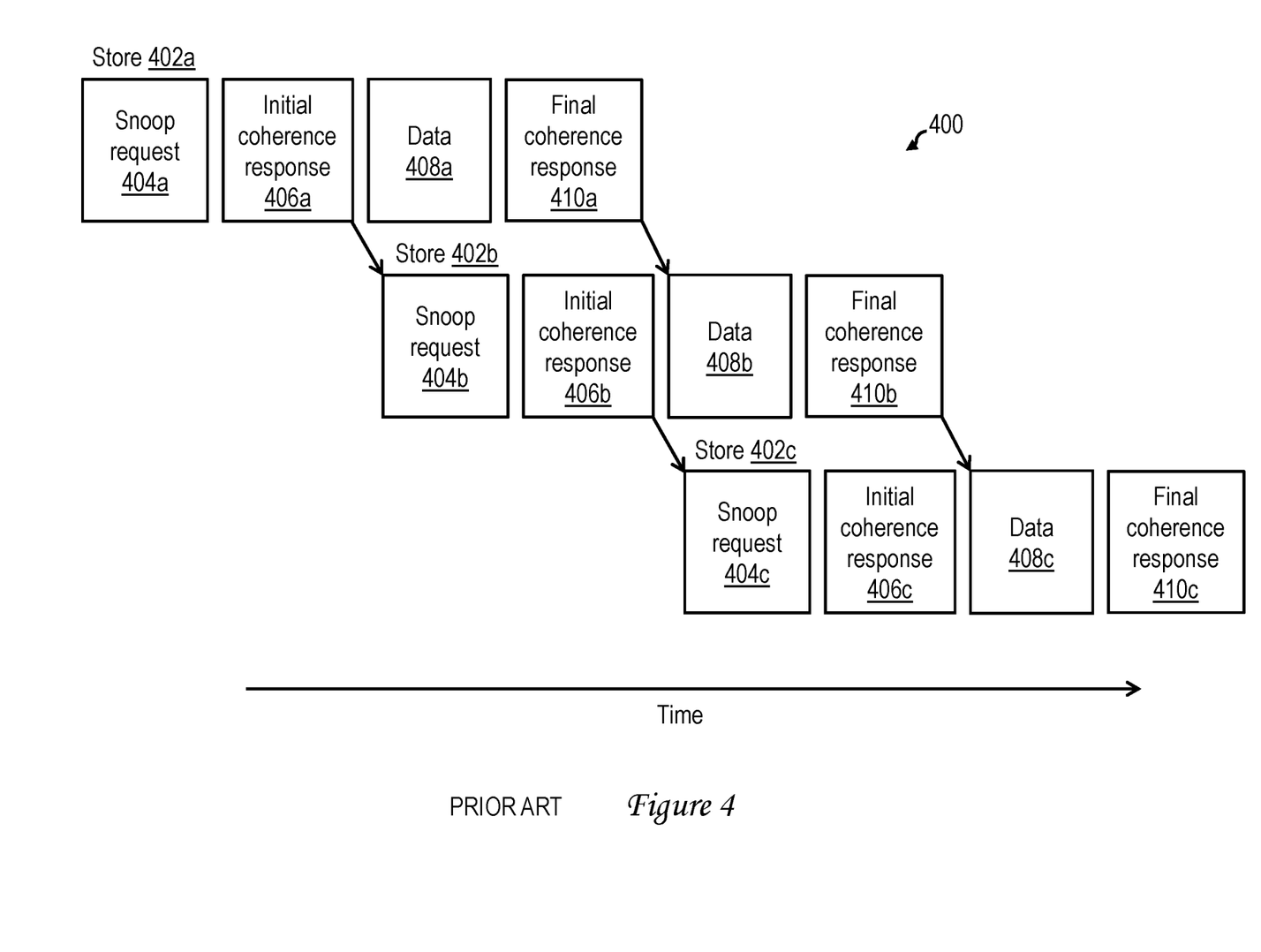
FIG. 4 is a timing diagram of an exemplary I/O store stream in accordance with the prior art.

Referring now to FIG. 4, there is depicted a timing diagram of an exemplary I/O store stream 400 in accordance with the prior art. In the depicted example, I/O store stream 400, which is initiated by an individual I/O requestor, such as an IBU 122, includes three store operations 402a, 402b, 402c requesting updates to one or more coherent memory addresses.

In this example, each store operation 402a-402c in I/O store stream 400 includes at least four tenures on the system fabric 102, including, in sequence, a snoop request 404, an initial coherence response 406, a data tenure 408, and a final coherence response 410. The snoop request 404, which specifies the target memory address of the storage location to be updated, is initiated on a system fabric by the I/O requestor. In response to the snoop request 404, a coherence manager (e.g., a cache or memory controller) that is coupled to the system fabric obtains coherence ownership of the target address (representing authority to control the update to the storage location), if necessary by issuing one or more additional commands on the system fabric. Based on acquiring coherence ownership, the coherence manager issues an initial coherence response 406 indicating acceptance of the snoop request. In response to receiving initial coherence response 406, the I/O requestor initiates transmission of the store data to the storage location via the system fabric in data tenure 408. Once the storage location is updated with the store data, the coherence manager transmits final coherence response 410 to the I/O requestor to confirm completion of the update to the target storage location.

As indicated by arrows, in I/O store stream 400, the I/O requestor does not issue a subsequent snoop request 404 until the I/O requestor has received an initial coherence response 406 indicating acceptance of a preceding snoop request 404. Thus, the I/O requestor does not issue snoop request 404b on the system fabric until the I/O requestor has received initial coherence response 406a of store operation 402a. Similarly, the I/O requestor does not issue snoop request 404c on the system fabric until the I/O requestor has received initial coherence response 406b of store operation 402b. This first ordering requirement is enforced for the purpose of deadlock avoidance because otherwise a subsequent store operation in an I/O store stream may acquire a resource needed by a prior store operation, resulting in a hang condition.

FIG. 4 also illustrates that in I/O store stream 400, the I/O requestor delays the data tenure 408 of all subsequent store operations until the I/O requestor has received the final coherence response 410 of all of its prior store operations to the same target address. Thus, the I/O requestor does not initiate data tenure 408b of store operation 402b on the system fabric until the I/O requestor has received final coherence response 410a of store operation 402a. Similarly, the I/O requestor does not initiate data tenure 408c of store operation 402c on the system fabric until the I/O requestor has received final coherence response 410b of store operation 402b. This second ordering requirement ensures that the store data of a subsequent store operation does not become observable if a prior store operation in I/O store stream 400 to the same target address fails.

The two ordering requirements of prior art store stream 400 inherently create two performance-limitations. In particular, the first ordering requirement limits the rate at which the I/O requestor can launch snoop requests 404a-404c to the roundtrip latency between the issuance of a snoop request 404a-404c and receipt of the corresponding initial coherence response 406a-406c. In addition, the second ordering requirement limits the rate at which the I/O requestor can launch data tenures 408 to the roundtrip latency between issuance of a data tenure 408a-408c and receipt of the corresponding final coherence response 410a-410c. As a result, the two ordering requirement of prior art store stream 400 impose a performance limitation on I/O store bandwidth throughout a data processing system.

The present disclosure appreciates that it would be desirable and beneficial to improve I/O store performance by implementing an improved coherence protocol that eliminates unneeded serializations between coherence responses of prior store operations and the progress of subsequent store operations. By eliminating these unneeded serializations, the improved coherence protocol supports the establishment, in parallel, of coherency for multiple store operations targeting coherent storage locations.

Figure 5:
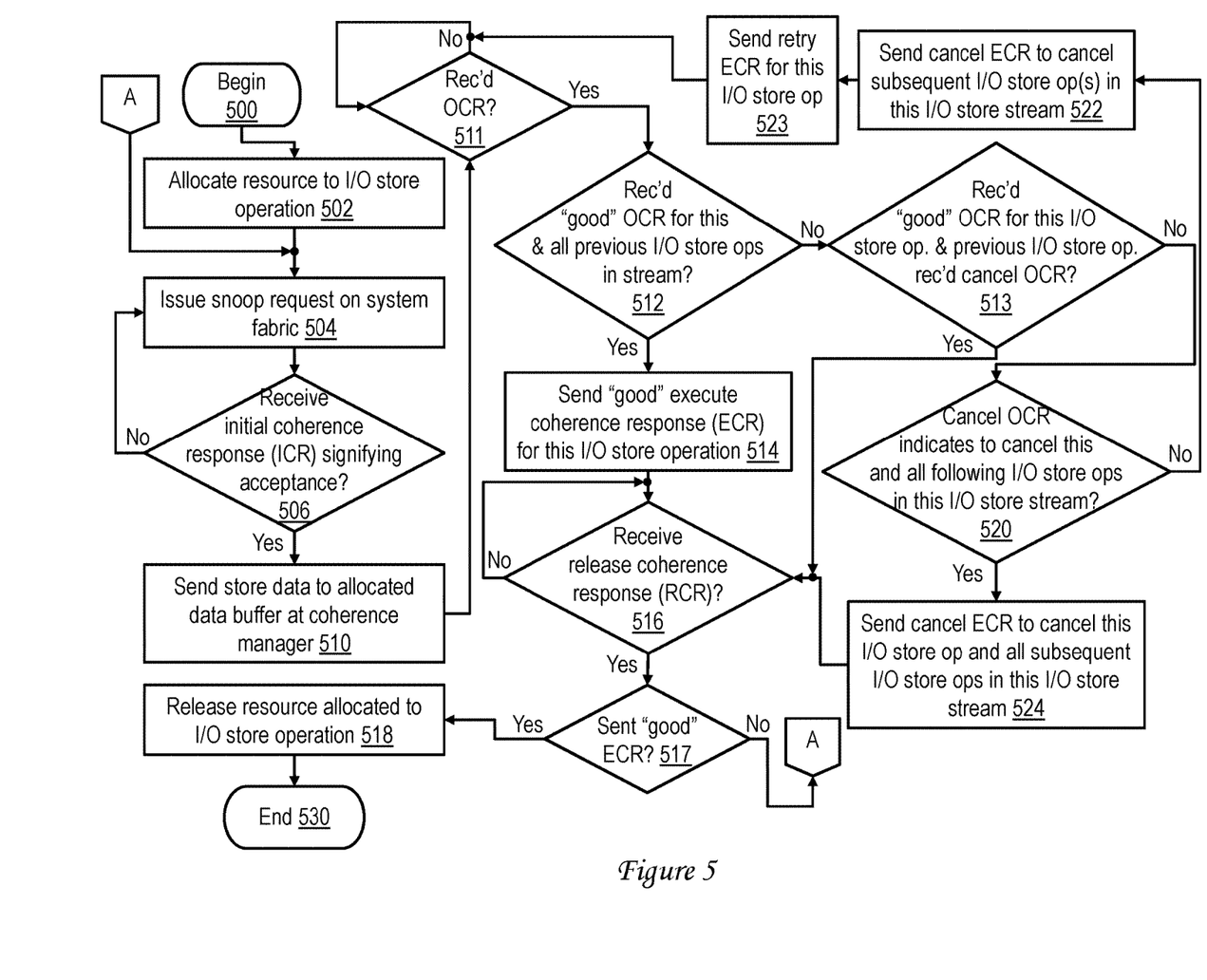
FIG. 5 is a high-level logical flowchart of an exemplary process by which an I/O requestor performs a store operation to facilitate I/O store pipelining in accordance with one embodiment.

With reference now to FIG. 5, there is illustrated a high-level logical flowchart of an exemplary process by which an I/O requestor performs an I/O store operation to facilitate I/O store pipelining in accordance with one embodiment. The process begins at block 500 and then proceeds to block 502, which illustrates an I/O requestor allocating a resource, such as a queue and/or state machine, to an I/O store operation. In data processing systems 100, 200, and 300, the I/O requestor may be, for example, an IBU 122, which may allocate a resource to an I/O store operation at block 502 in response to receipt of a corresponding I/O store request from one of the IOAs 130 to which it is coupled (e.g., through an I/O fabric 124, such as a PCIe bus).

In response to allocation of the resource to the I/O store operation at block 502, the I/O requestor issues a snoop request to system fabric 102 of the data processing system 100, 200, or 300. The snoop request can specify, for example, at least a command type (e.g., I/O store) and a target address in the real address space employed for system memory. As will be appreciated by those skilled in the art, determination of the appropriate real address to be specified in the snoop request may require address translation (e.g., by the I/O requestor) from an I/O address space to the real address space. Following issuance of the snoop request at block 504, the I/O requestor monitors for receipt of an initial coherence response (ICR) from a coherence manager coupled to the system fabric 102 (block 506). The ICR indicates whether or not the coherence manager has accepted the snoop request and allocated a data buffer to buffer the store data of the I/O store operation.

The coherence manager responsible for providing the ICR can vary, depending on the architecture of the data processing system and the implementation details of the coherence protocol. In some implementations, the coherence manager is a fixed component, such as a memory coherence directory; in other implementations, the identity of the coherence manager can differ for different operations. In a data processing system 100, 200, or 300, the coherence manager can be, for example, a cache memory 106 or a FBC 132, depending on dynamic conditions within the data processing system at the time the snoop request issued on system fabric 102. For example, in one embodiment, a cache memory 106 then buffering a systemwide unique copy of a cache line identified by the target address, if present, will serve as the coherence manager of the I/O store operation. If no such cache memory 106 is present in the data processing system 100, 200, or 300 when the snoop request is issued on the system fabric 102, a FBC 132 can serve as the coherence manager of the I/O store operation. As will be appreciated, the determination of which component is responsible for serving as the coherence manager of the I/O store operation may entail additional unillustrated coherence messaging.

In response to receipt of the ICR for the snoop request, the I/O requestor determines at block 506 whether or not the ICR signifies acceptance of the snoop request by the coherence manager. If the I/O requestor determines at block 506 that the ICR signifies acceptance of the snoop request by the coherence manager, the process proceeds to block 510 and following blocks, which are described below. If, however, the I/O requestor determines at block 506 that the ICR does not signify acceptance of the snoop request by the coherence manager, the ICR is a Retry ICR indicating that the I/O requestor must reissue the snoop request. In response to the Retry ICR, the I/O requestor reissues the snoop request on the system fabric 102, as indicated by the process returns from block 506 to block 504.

Referring now to block 510, based on receipt of an ICR signifying acceptance of the snoop request by the coherence manager, the I/O requestor initiates a data tenure on the system fabric 102 to transmit the store data of the I/O store operation to the coherence manager. In response to receipt of data tenure, the coherence manager buffers the store data of the I/O store operation in the allocated data buffer, but does not automatically initiate performance of the indicated update of the storage location identified by the target address (where in various scenarios, the storage update can be performed by the coherence manager or another component, such as a memory controller 108 or cache 106). Instead, the coherence manager first attempts to obtain coherence ownership of the target address (if not already acquired), as described further below with reference to block 616 of FIG. 6. If the attempt to obtain coherence ownership of the target address of the I/O store operation is successful, the coherence manager indicates coherence ownership of the target address to the I/O requestor by issuing, via system fabric 102, a "good" ownership coherence response (OCR). Alternatively, if the attempt to obtain coherence ownership of the target address of the I/O store operation is unsuccessful, the coherence manager provides a OCR indicating failure to obtain coherence ownership of the target address.

At block 511, the I/O requestor monitors for receipt of the OCR via the system fabric 102. In response to receipt of the OCR, the I/O requestor determines at block 512 whether the OCR is a "good" OCR indicating acquisition of coherence ownership for the current I/O store operation and all previous I/O store operations in the same I/O store stream. If not, the process passes to block 513 and following blocks, which are described below. If, however, the I/O requestor makes an affirmative determination at block 512, the I/O requestor sends a "good" execute coherence response (ECR) to the coherence manager via the system fabric 102 to command the coherence manager to actually update the storage location associated with the target address with the store data (block 514). Following issuance of the good ECR, the I/O requestor monitors for receipt of a release coherence response (RCR) from the coherence manager via the system fabric 102 (block 516). The RCR indicates that the coherence manager has performed the storage update for the target address and has released coherence ownership of the target address and the resource(s) (e.g., data buffer) allocated to the I/O store operation. In response to a determination at block 516 that the RCR of the I/O store operation has been received, the I/O requestor determines at block 517 whether or not it earlier provided a "good" ECR at block 514. If so, the I/O requestor releases its resource(s) (e.g., queue and/or state machine) allocated to the I/O store operation (block 518), and the process of FIG. 5 ends at block 530. If, however, I/O requestor determines at block 517 that it did not provide a "good" ECR at block 514, the I/O requestor reissues the I/O store operation on the system fabric 102, as indicated by the process returning via page connector A to block 504.

With reference now to block 513, the I/O requestor determines whether it has received a "good" OCR for the current I/O store operation and, for a prior I/O store operation in the same I/O store stream, has received a "cancel" OCR indicating cancelation of the prior I/O store operation. In response to an affirmative determination at block 513, the process passes to block 516, which has been described. If, however, the I/O requestor makes a negative determination at block 513, the process proceeds to block 520, which depicts the I/O requestor determining whether it has received a "cancel" OCR indicating that the I/O requestor is to cancel the current I/O store operation and all subsequent I/O store operations in the I/O store stream. If so, the I/O requestor transmits a "cancel" ECR on the system fabric 102 that indicates that the coherence manager is to cancel the current I/O store operation and all subsequent I/O store operations, if any, in the I/O store stream (block 524). Thereafter, the process passes to block 516, which has been described. Referring again to block 520, in response to a negative determination, meaning that the "cancel" OCR indicates to cancel all subsequent I/O store operations, if any, in the I/O store stream but not the current I/O store operation, the I/O requestor transmits a "cancel" ECR on the system fabric 102 that indicates that the coherence manager is to cancel all subsequent I/O store operations, if any, in the I/O store stream (block 522). As shown at block 523, the I/O requestor also communicates a retry ECR for the current I/O store operation to indicate the coherence manager is to again attempt to obtain coherence ownership of the target address of the I/O store operation. In various embodiments, the retry ECR shown at block 523 can be communicated in the same coherence message or different coherence messages from the cancel ECR depicted at block 522. Following block 523, the process returns to block 511, which illustrates the I/O requestor monitoring for an updated OCR, which may indicate that the coherence manager successfully acquired coherence ownership of the target address.

Figure 6A:
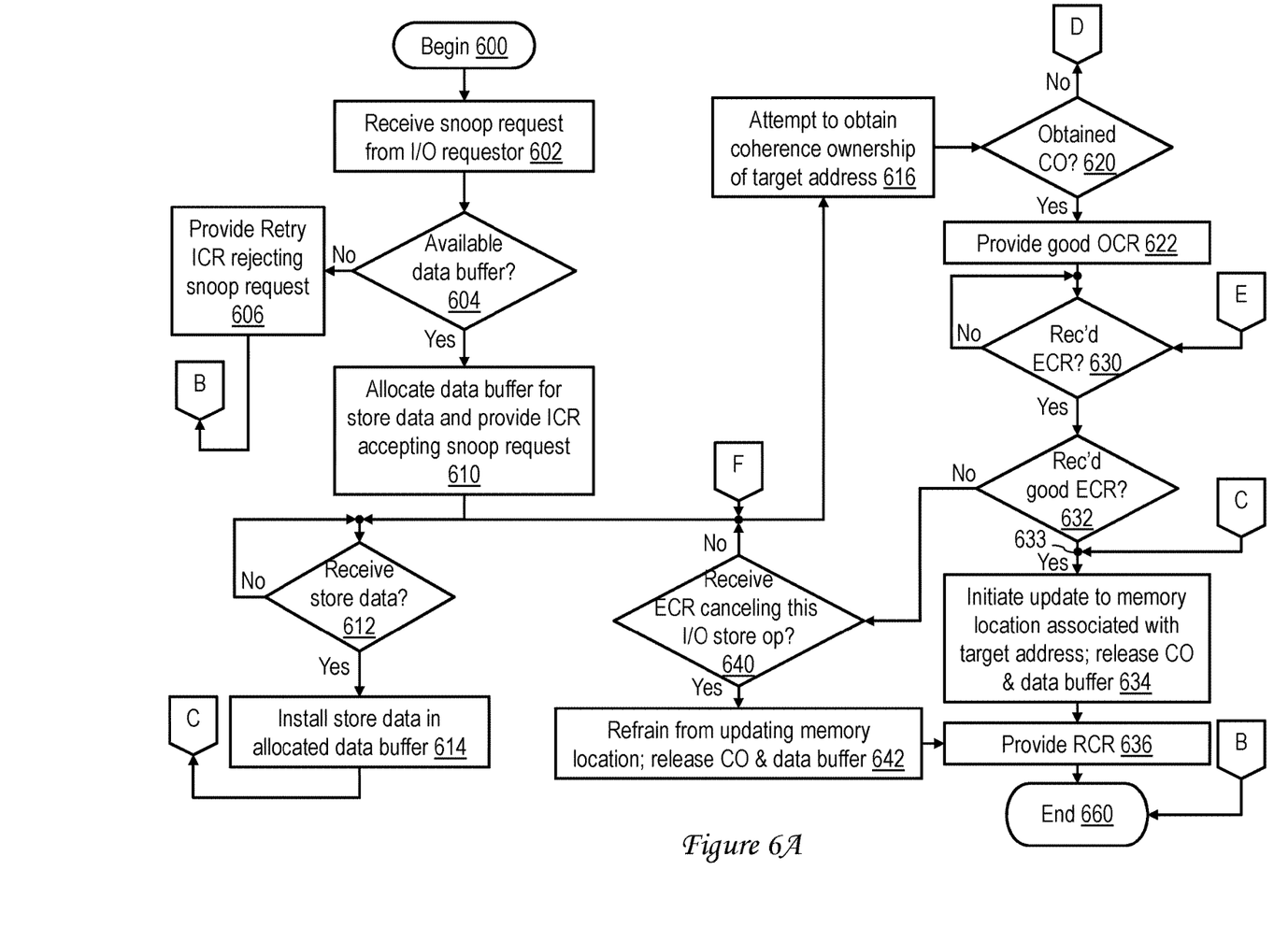
FIGS. 6A-6B together form a high-level logical flowchart of an exemplary process by which a coherence manager handles a snooped I/O store operation in accordance with one embodiment.
Figure 6B:
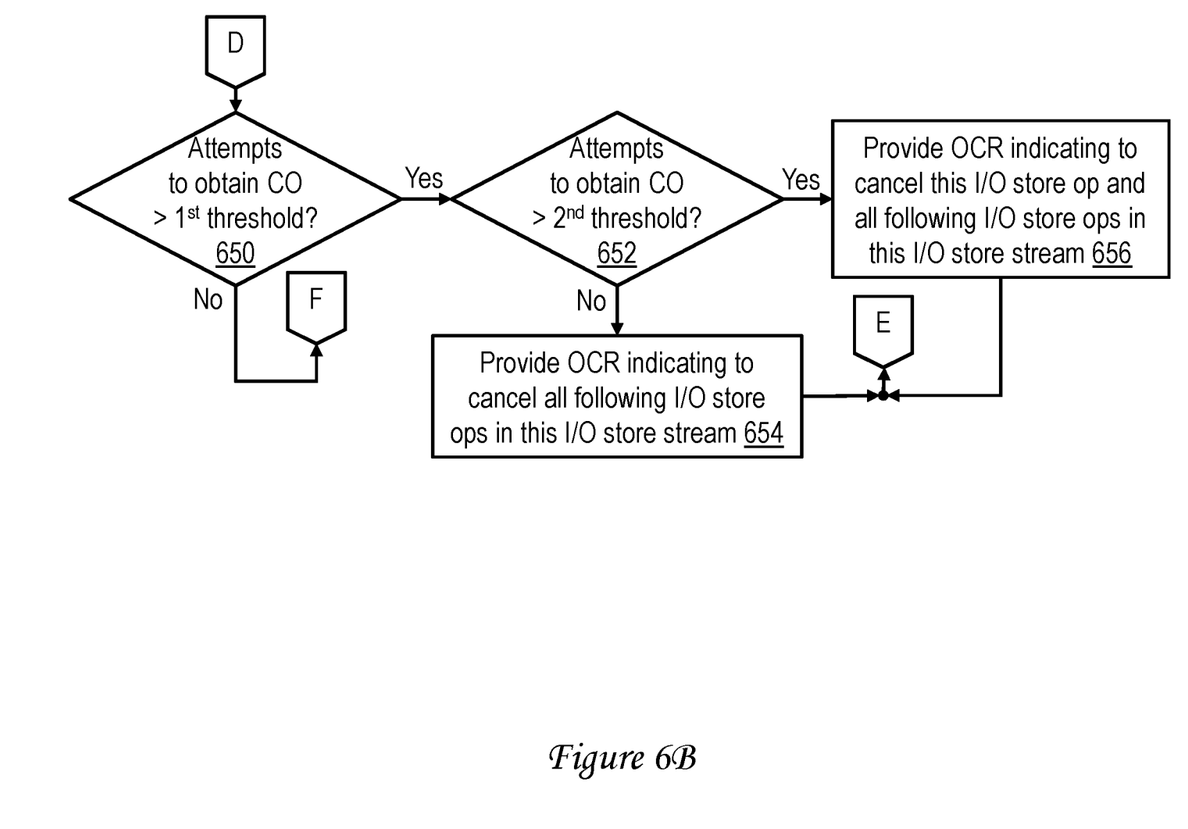

Referring now to FIGS. 6A-6B, there is depicted a high-level logical flowchart of an exemplary process by which a coherence manager handles a snooped I/O store operation in accordance with one embodiment. The process of FIGS. 6A-6B begins at block 600 and then proceeds to block 602, which illustrates a coherence manager receiving a snoop request of an I/O store operation from an I/O requestor via the system fabric 102. As noted above, a data processing component capable of serving as the coherence manager for the I/O store operation may communicate one or more messages with other components similarly capable of serving as the coherence manager to determine which component will serve as the coherence manager for the I/O store operation. At block 604, the coherence manager determines whether or not the coherence manager has a data buffer available to buffer the store data of the I/O store operation. If not, the coherence manager issues on the system fabric 102 a Retry ICR rejecting the snoop request (block 606). As described above, the I/O requestor, responsive to the Retry ICR, reissues the snoop request as illustrated at blocks 504-506 of FIG. 5. Following block 606, the process of FIG. 6 passes through page connector B and ends at block 660.

Returning to block 604, in response to the coherence manager determining that it has an available data buffer for buffering the store data of the I/O store operation snooped at block 602, the coherence manager allocates a data buffer for buffering the store data of the I/O store operation and issues an ICR signifying acceptance of the snoop request to the I/O requestor via the system fabric 102 (block 610). Following issuance of the ICR, the process bifurcates and proceeds in parallel to block 612 and block 616. Block 612 illustrates the coherence manager awaiting receipt of the store data of the I/O store operation. In response to receipt of the store data, the coherence manager installs the store data in the data buffer allocated to the I/O store operation (block 614). The coherence manager may additionally forward the store data to another component that is to actually perform the storage update requested by the I/O store operation (e.g., a controller of a cache 106 or memory controller 108). The process then proceeds through page connector C to join point 633.

While awaiting the store data of the I/O store operation, the coherence manager may concurrently handle one or more other I/O store operations of the same I/O requestor (including I/O store operations to the same target address) and/or other I/O requestor(s) as long as the coherence manager has available data buffer(s). In addition, if the coherence manager does not already have coherence ownership of the cache line identified by the target address of the I/O store operation, the coherence manager attempts to obtain coherence ownership of the target address, for example, by issuing one or more commands on the system fabric 102 (block 616). These commands may be, for example, invalidation commands to invalidate one or more shared copies of the cache line held in caches 106. At block 620, the coherence manager determines whether or not it has obtained coherence ownership of the target address of the I/O store operation. If the coherence manager determines at block 620 that it has failed to acquire coherence ownership of the target address, the process passes through page connector D to FIG. 6B, which is described below. However, in response to the coherence manager determining at block 620 that it has acquired coherence ownership of the target address of the I/O store operation, the coherence manager issues a "good" OCR for the I/O store operation to the I/O requestor via the system fabric 102 (block 622). The "good" OCR indicates to the I/O requestor that the coherence manager was successful in acquiring coherence ownership of the target address of the I/O store operation.

Following issuance of the "good" OCR at block 622, the coherence manager awaits receipt of an ECR from the I/O requestor via the system fabric 102 (block 630). In response to receipt of the ECR, the coherence manager determines at block 632 whether or not the ECR is a "good" ECR that instructs the coherence manager to initiate the update to the storage location identified by the target address of the I/O store operation. In response to a negative determination at block 632, the coherence manager determines at block 640 whether the ECR commands the coherence manager to cancel the I/O store operation. In response to a negative determination at block 640, the process returns to block 616, which has been described. If, however, the coherence manager determines at block 640 that the ECR commands the coherence manager to cancel the I/O store operation, the coherence manager refrains from initiating an update to the storage location identified by the target address and releases coherence ownership of the target address and the data buffer allocated to the I/O store operation (block 642). Thereafter, the process passes to block 636, which is described below.

Returning to block 632, in response to the coherence manager determining that the ECR is a "good" ECR that commands the coherence manager to make the storage update indicated by the I/O store operation, the process proceeds to join point 633. When the coherence manager has received both the store data of the I/O store operation and the "good" ECR at join point 633, the coherence manager initiates the update, with the store data, of the cache line identified by the target address (block 634). For example, in a data processing system 100, 200, or 300, the coherence manager may initiate writing the store data into a cache 106 or system memory (e.g., by a cache controller of a cache 106 or memory controller 108). As further depicted at block 634, following the update to the cache line identified by the target address, the coherence manager releases the data buffer allocated to the I/O store operation and coherence ownership of the target address. Based on release of the data buffer and coherence ownership, the coherence manager issues a RCR via system fabric 102 to the I/O requestor (block 636). Thereafter, the process of FIG. 6A ends at block 660.

Referring now to FIG. 6B, the process continues from page connector D to block 650, which illustrates the coherence manager determining whether or not the number of attempts to obtain coherence ownership of the target address of the I/O store operation is greater than a first threshold. If not, the process returns to block 616 of FIG. 6A through page connector F. If, however, the coherence manager determines at block 650 that it has attempted to obtain coherence ownership of the target address of the I/O store operation more than a first threshold number of times, the coherence manager additionally determines at block 652 whether or not it has attempted to obtain coherence ownership of the target address of the I/O store operation more than a greater second threshold number of times. If not, the coherence manager issues on the system fabric 102 an OCR indicating cancelation of any subsequent I/O store operations in the same I/O store stream (block 654). If, however, the coherence manager determines at block 652 that it has attempted to obtain coherence ownership of the target address of the I/O store operation more than the second threshold number of times, the coherence manager issues on the system fabric 102 an OCR indicating cancelation of the current I/O store operation and any subsequent I/O store operations in the same I/O store stream (block 656). Following either of blocks 654 or 656, the process passes through page connector E to block 630 of FIG. 6A, which has been described.

Figure 7:
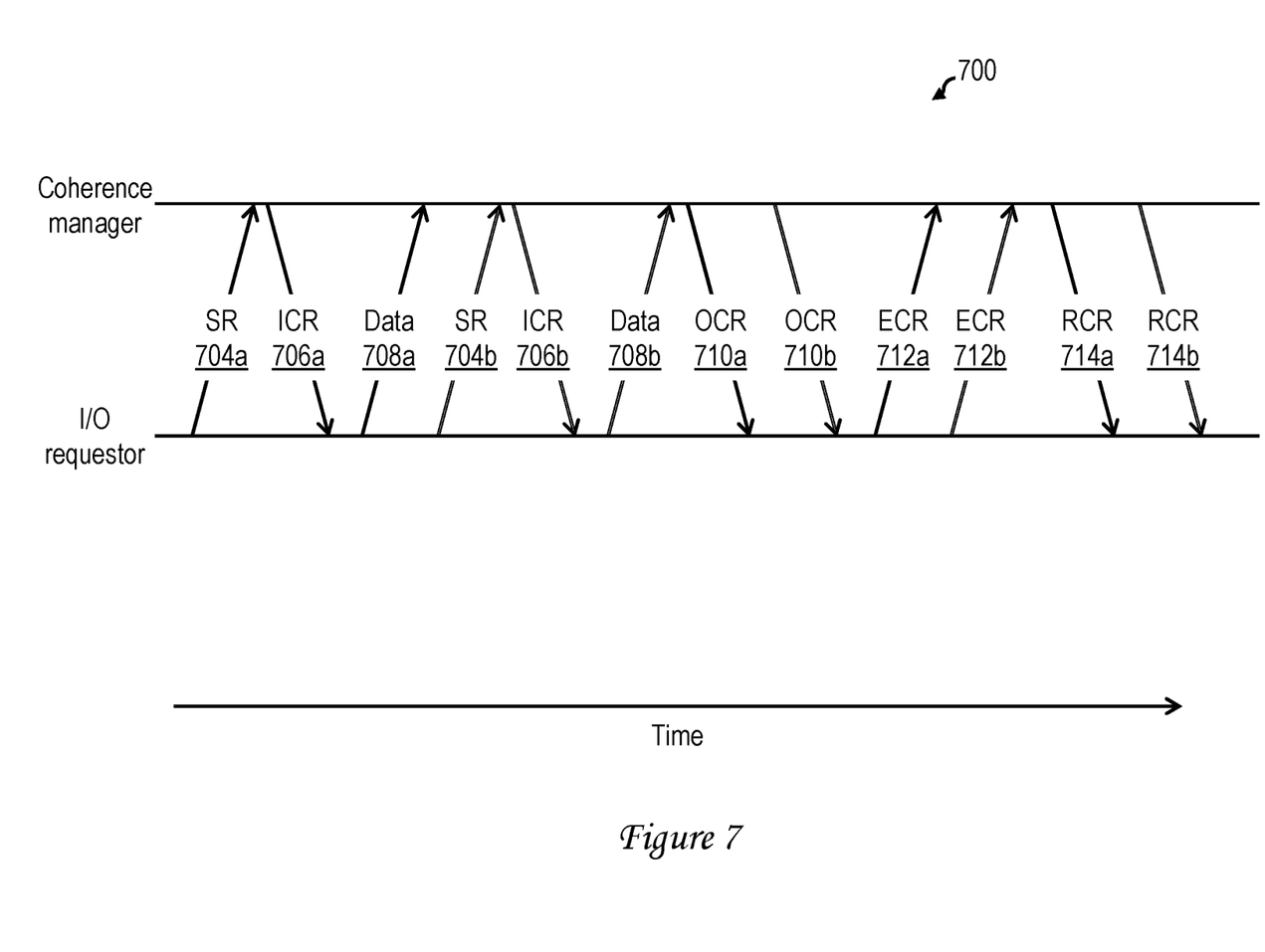
FIG. 7 is a timing diagram illustrating I/O store pipelining in accordance with one embodiment.

With reference now to FIG. 7, there is illustrated a timing diagram of the pipelining of I/O store operations in accordance with one embodiment. In this example, an I/O store stream 700 includes at least two concurrent I/O store operations targeting coherent memory addresses. Tenures on the system fabric 102 associated with the first I/O store operation are denoted by reference numerals ending with "a" (e.g., SR 704a, ICR 706a, data tenure 708a, OCR 710a, ECR 712a, and RCR 714a), and tenures on the system fabric 102 associated with the second I/O store operation are denoted by reference numerals ending with "b" (e.g., SR 704b, ICR 706b, data 708b, OCR 710b, ECR 712b, and RCR 714b). The I/O requestor begins the first I/O store operation by issuing, on the system fabric 102, a snoop request (SR) 704a, to which the coherence manager responds with ICR 706a. In response to receipt of ICR 706a, the I/O requestor transmits the store data in a data tenure 708a.

At any point in time following issuance of SR 704a, I/O requestor may initiate a concurrent second I/O store operation by issuing a second SR 704b specifying the same target address as SR 704a. In the illustrated example, the I/O requestor issues SR 704b following issuance of data tenure 708a, but before receipt by the I/O requestor of OCR 710a for the first I/O store operation from the coherence manager. The coherence manager responds to SR 704b with ICR 706b. In response to receipt of ICR 706b, the I/O requestor transmits the store data in a data tenure 708b.

Following data tenure 708b, the coherence manager issues OCR 710a for the first I/O store operation and OCR 710b for the second I/O store operation. Each of OCRs 710a, 710b indicates that the coherence manager has acquired coherence ownership of the target addresses of the first and second I/O store operations. Following OCR 710b, the I/O requestor issues ECR 712a for the first I/O store operation and ECR 712b for the second I/O store operation. As noted above, ECRs 712a, 712b request the coherence manager to update the storage location identified by the target address with the store data transmitted in data tenures 708a, 708b. The coherence manager confirms completion of the indicated updates to the storage location by thereafter issuing RCRs 714a, 714b.

As has been described, in at least one embodiment, a data processing system includes a system fabric coupling a coherence manager and an input/output (I/O) requestor. The I/O requestor issues a first snoop request of a first I/O store operation and a subsequent second snoop request of a second I/O store operation. Each of the first and second snoop requests specifies an update to a respective storage location identified by a coherent memory address. The I/O requestor receives respective ownership coherence responses for each of the first and second I/O store operations. The respective first and second ownership coherence responses indicate the coherence manager has concurrent coherence ownership of the memory address for both the first and second I/O store operations. In response to receipt of each of the ownership coherence responses, the I/O requestor issues respective first and second execute coherence responses to command the coherence manager to initiate updates to the respective storage locations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown as described with reference to one or more preferred embodiments, it will be understood by those skilled in the art that various changes in form and detail may be made therein without departing from the spirit and scope of the appended claims. Although aspects have been described with respect to a data processing hardware that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude signal media per se, transitory propagating signals per se, and energy per se.

The figures described above and the written description of specific structures and functions are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of data processing in a data processing system including a system fabric to which a coherence manager and an input/output (I/O) requestor are coupled, the method comprising:

the I/O requestor issuing on the system fabric a first snoop request of a first I/O store operation and a subsequent second snoop request of a second I/O store operation, wherein the first and second I/O store operations are within a same ordered I/O store stream, and wherein each of the first and second snoop requests specifies an update to a respective storage location identified by a coherent memory address;

the I/O requestor receiving, via the system fabric from the coherence manager, respective ownership coherence responses for each of the first and second I/O store operations, wherein the respective first and second ownership coherence responses indicate the coherence manager has concurrent coherence ownership of the memory address for both the first and second I/O store operations;

the I/O requestor sending, on the system fabric, store data of the first and second I/O store operations; and based upon receipt of each of the ownership coherence responses, the I/O requestor issuing, via the system fabric, respective first and second execute coherence responses to command the coherence manager to initiate updates to the respective storage locations with the store data wherein:

the I/O requestor issues the first execute coherence response after sending the store data of the first I/O store operation on the system fabric;

the I/O requestor issues the second execute coherence response after sending the store data of the second I/O store operation on the system fabric;

the I/O requestor issuing a third snoop request of a third I/O operation in the ordered I/O store stream to the coherence manager; and based on receiving a coherence response for the third I/O operation, the I/O requestor canceling a subsequent fourth I/O store operation in the ordered I/O store stream, wherein the canceling includes:

based on the coherence response indicating failure of the coherence manager to obtain coherence ownership of a target address of the third snoop request a first number of times but not a greater second number of times, the I/O requestor canceling the fourth I/O store operation but not the third I/O operation; and based on the coherence response indicating failure of the coherence manager to obtain coherence ownership of a target address at least the second number of times, the I/O requestor canceling both the third I/O store operation and the fourth I/O store operation.

2. The method of claim 1, wherein the first snoop request and the second snoop request both specify a common memory address.

3. The method of claim 1, wherein the I/O requestor issues the second execute coherence response based on receipt of both of the first and second ownership coherence responses.

4. The method of claim 1, wherein the I/O requestor issuing the second snoop request comprises the I/O requestor issuing the second snoop request prior to receipt by the I/O requestor of the first ownership coherence response for the first I/O store operation.

5. The method of claim 1, further comprising:

the I/O requestor sending store data of the second I/O store operation to the coherence manager via the system fabric based on receipt of an initial coherence response indicating acceptance of the second snoop request by the coherence manager and prior to receipt of the second ownership coherence response; and the I/O requestor thereafter receiving, from the coherence manager via the system fabric, a release coherence response signaling completion of the first I/O store operation.

6. The method of claim 1, wherein:

the I/O requestor sends the store data of the first I/O store operation on the system fabric prior to receipt by the I/O requestor of the ownership coherence response for the first I/O store operation;

the I/O requestor sends the store data of the first I/O store operation on the system fabric prior to receipt by the I/O requestor of the ownership coherence response for the second I/O store operation.

7. A data processing system, comprising:

a system fabric;

a coherence manager coupled to the system fabric; and an input/output (I/O) requestor coupled to the system fabric, wherein the I/O requestor is configured to perform:

issuing on the system fabric a first snoop request of a first I/O store operation and a subsequent second snoop request of a second I/O store operation, wherein the first and second I/O store operations are within a same ordered I/O store stream, and wherein each of the first and second snoop requests specifies an update to a respective storage location identified by a coherent memory address;

receiving, via the system fabric from the coherence manager, respective ownership coherence responses for each of the first and second I/O store operations, wherein the respective first and second ownership coherence responses indicate the coherence manager has concurrent coherence ownership of the memory address for both the first and second I/O store operations;

issuing, on the system fabric, store data of the first and second I/O store operations;

based on receipt of each of the ownership coherence responses, issuing, via the system fabric, respective first and second execute coherence responses to command the coherence manager to initiate updates to the respective storage locations with the store data, wherein:

the I/O requestor issues the first execute coherence response after sending the store data of the first I/O store operation on the system fabric; and the I/O requestor issues the second execute coherence response after sending the store data of the second I/O store operation on the system fabric issuing a third snoop request of a third I/O operation in the ordered I/O store stream to the coherence manager; and based on receiving a coherence response indicating retry of the third I/O operation, canceling a subsequent fourth I/O store operation in the ordered I/O store stream, wherein the canceling includes:

based on the coherence response indicating failure of the coherence manager to obtain coherence ownership of a target address of the third snoop request a first number of times but not a greater second number of times, the I/O requestor canceling the fourth I/O store operation but not the third I/O operation; and based on the coherence response indicating failure of the coherence manager to obtain coherence ownership of a target address at least the second number of times, the I/O requestor canceling both the third I/O store operation and the fourth I/O store operation.

8. The data processing system of claim 7, wherein the first snoop request and the second snoop request both specify a common memory address.

9. The data processing system of claim 7, wherein the I/O requestor is configured to issue the second execute coherence response based on receipt of both of the first and second ownership coherence responses.

10. The data processing system of claim 7, wherein the I/O requestor is configured to issue the second snoop request prior to receipt by the I/O requestor of the first ownership coherence response for the first I/O store operation.

11. The data processing system of claim 7, wherein the I/O requestor is further configured to perform:
sending store data of the second I/O store operation to the coherence manager via the system fabric based on receipt of an initial coherence response indicating acceptance of the second snoop request by the coherence manager and prior to receipt of the second ownership coherence response; and
thereafter receiving, from the coherence manager via the system fabric, a release coherence response signaling completion of the first I/O store operation.

12. The data processing system of claim 7, wherein the I/O requestor is configured to:
send the store date of the first I/O store operation on the system fabric prior to receipt by the prior I/O requestor of the ownership coherence response for the first I/O store operation;
send the store date of the second I/O store operation on the system fabric prior to receipt by the prior I/O requestor of the ownership coherence response for the second I/O store operation.

13. A program product, comprising:
a storage device; and
program code stored within the storage device, wherein the program code, when executed by a I/O requestor, causes the I/O requestor to perform:
issuing on the system fabric a first snoop request of a first I/O store operation and a subsequent second snoop request of a second I/O store operation, wherein the first and second I/O store operations are within a same ordered I/O store stream, and wherein each of the first and second snoop requests specifies an update to a respective storage location identified by a coherent memory address;
receiving, via the system fabric from the coherence manager, respective ownership coherence responses for each of the first and second I/O store operations, wherein the respective first and second ownership coherence responses indicate the coherence manager has concurrent coherence ownership of the memory address for both the first and second I/O store operations;
issuing, on the system fabric, store data of the first and second I/O store operations;
based on receipt of each of the ownership coherence responses, issuing, via the system fabric, respective first and second execute coherence responses to command the coherence manager to initiate updates to the respective storage locations with the store data wherein:
the I/O requestor issues the first execute coherence response after sending the store data of the first I/O store operation on the system fabric; and
the I/O requestor issues the second execute coherence response after sending the store data of the second I/O store operation on the system fabric;
issuing a third snoop request of a third I/O operation in the ordered I/O store stream to the coherence manager; and
based on receiving a coherence response indicating retry of the third I/O operation, canceling a subsequent fourth I/O store operation in the ordered I/O store stream,
based on the coherence response indicating failure of the coherence manager to obtain coherence ownership of a target address of the third snoop request a first number of times but not a greater second number of times, the I/O requestor canceling the fourth I/O store operation but not the third I/O operation; and
based on the coherence response indicating failure of the coherence manager to obtain coherence ownership of a target address at least the second number of times, the I/O requestor canceling both the third I/O store operation and fourth I/O store operation.

14. The program product of claim 13, wherein the first snoop request and the second snoop request both specify a common memory address.

15. The program product of claim 13, wherein the program code causes the I/O requestor to issue the second execute coherence response based on receipt both of the first and second ownership coherence responses.

16. The program product of claim 13, wherein the program code causes the I/O requestor to issue the second snoop request prior to receipt by the I/O requestor of the first ownership coherence response for the first I/O store operation.

17. The program product of claim 13, wherein the program code causes the I/O requestor to perform:
sending store data of the second I/O store operation to the coherence manager via the system fabric based on receipt of an initial coherence response indicating acceptance of the second snoop request by the coherence manager and prior to receipt of the second ownership coherence response; and
thereafter receiving, from the coherence manager via the system fabric, a release coherence response signaling completion of the first I/O store operation.

18. The program product of claim 13, wherein the program code, when executed causes the I/O requestor to:
send the store date of the first I/O store operation on the system fabric prior to receipt by the prior I/O requestor of the ownership coherence response for the first I/O store operation;
send the store date of the second I/O store operation on the system fabric prior to receipt by the prior I/O requestor of the ownership coherence response for the second I/O store operation.

* * * * *